Patented Mar. 30, 1954

2,673,847

UNITED STATES PATENT OFFICE 2,673,847

STEROID EPOXIDES

George B. Spero and Robert H. Levin, Kalamazoo, Mich., assignors to The Upjohn Company, Kalamazoo, Mich., a corporation of Michigan No Drawing. Application November 9, 1951,
Serial No. 255,731

14 Claims. (Cl. 260—239.55)

The present invention relates to certain steroid epoxides and is more particularly concerned with the 3(4),17(20)-dioxides of the poly-enol acylates of pregnane-3,11,20-trione and to a process for the production thereof.

The novel compounds of the present invention are the 3(4),17(20)-dioxides of the poly-enol acylates of pregnane-3,11,20-trione wherein the acyloxy groups are of the formula AcO, Ac being the residue of an organic carboxylic acid, especially such acids containing from one to eight carbon atoms, inclusive, which may be represented by the following structural formulae:

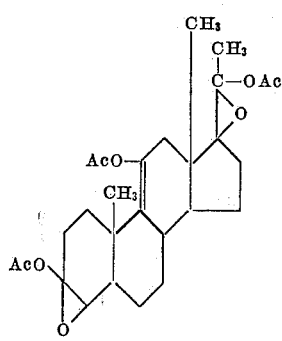

and

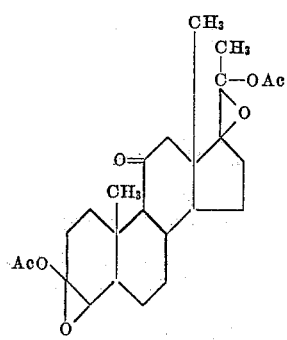

An object of the present invention is to provide a novel group of dioxido steroid compounds which are useful in the preparation of physiologically active steroid compounds containing an oxygen atom at carbon atom 11 and in addition have certain physiological activity per se. Another object of the present invention is the provision of a process for the epoxidation of the 3(4) and the 17(20) double bonds of the poly-enol acylates of pregnane-3,11,20-trione, thereby forming the 3(4),17(20)-dioxides. Other objects of the present invention will be apparent to those skilled in the art to which this invention pertains.

The novel dioxido compounds of the present invention have utility as intermediates which can be used in a series of syntheses leading to the preparation of biologically active 11-keto steroids, such as cortisone. Such dioxides are of utility in the production of compounds with hydroxyl groups at positions four and seventeen as described in the copending application of Spero and Levin, Serial No. 255,732, filed November 9, 1951. The novel process of the present invention has utility in the preparation of certain steroid intermediates having an oxygen atom in the 11-position of the steroid nucleus. The process of the present invention provides an oxido linkage in the 17(20)-position from which the desired 17-alpha-hydroxy substituents can be easily formed in the synthesis of cortical hormones of the 17-alpha-hydroxy series. Furthermore, the process of the present invention concurrently leads to the formation of an oxide in the A ring of the steroid nucleus which can be utilized in further reactions. The presence of such an active group at position 3(4), is of great significance since it may be further converted to the alpha, beta-unsaturated ketone grouping which is common to most of the biologically active steroid hormones.

The starting compounds for the process of the present invention are the poly-enol acylates of pregnane-3,11,20-trione wherein the acyloxy groups are of the formula AcO, Ac being the residue of a carboxylic organic acid, preferably such acids containing from one to eight carbon atoms, inclusive. The starting enol-acylates are prepared by the enol-esterification of pregnane-3,11,20-trione, a compound known in the prior art [Reichstein and Fuchs, Helv. Chem. Acta., 26, 721 (1943)], by a method which involves reacting pregnane-3,11,20-trione with an acid anhydride of an organic monocarboxylic acid in the presence of an acid catalyst, such as sulfuric acid, a sulfonic acid, and the like. The details of the procedure required to produce the specific starting enol esters are illustrated more fully in the preparations following in this specification.

In the novel process of the present invention, the di-epoxides are formed by an oxidation reaction in which an atom of oxygen is added to each of two ethylenic linkages in the poly-enol acylates of pregnane-3,11,20-trione. Any oxidant or epoxidizing agent capable of furnishing the necessary oxygen may be employed. The agents most commonly used are the organic peracids or hydrogen peroxide. Organic peracids such as peracetic, perpropionic, perbutyric, perbenzoic, chloroperacetic, monoperphthalic, and others may be advantageously employed. Concentrated hydrogen peroxide ($H_2O_2$) may likewise be utilized in the form of a twenty to ninety percent by weight aqueous solution, a thirty percent solution being preferred. The epoxidation reaction is carried out by mixing the starting steroid, i. e., a di-enol acylate or a tri-enol acylate of pregnane-3,11,20-trione, in a solvent inert under the reaction conditions employed, such as chloroform, acetic acid, carbon tetrachloride, ethylene chloride, methylene chloride, mixtures of ether and chloroform and others. The ratio of oxygen-furnishing agent to starting steroid can be varied considerably within broad ranges. Ratios of up to twenty moles or more of the peracid or the concentrated hydrogen peroxide to one mole of the starting enol ester are operative, with ratios of from four to about twelve moles being preferred for attainment of optimum results, the precise ratio being preferably varied inversely with the reaction time employed. The reaction is carried out by the mixing together of the starting enol acylate and the peracid of choice, preferably peracetic acid, or hydrogen peroxide for a suitable period, e. g., from about one-half to twenty-four hours, the proper length of time depending upon the concentration of oxygen-furnishing agent.

When the oxidant is hydrogen peroxide, glacial acetic acid is a convenient reaction medium and when a peracid is employed, any of the customary organic solvents in which the starting steroid is soluble can be used. Sometimes it is desirable to add to the oxidizing medium a small quantity of an alkali metal salt, such as, for example, sodium acetate. Temperatures between about zero and about 100 degrees centigrade can be conveniently used, with room temperature being entirely satisfactory in most cases. In general, if a high temperature is employed, the reaction time may be somewhat reduced. The reaction mixture may be agitated continuously, as, for example, by shaking with a rotary shaking device or other conventional stirring or agitation means. Alternatively, when temperatures above room temperature are employed, the reaction may be conducted on a steam bath.

The 3(4),17(20-dioxido compounds can then be isolated in any convenient manner, such as by volatilizing the reaction medium, extracting the residue with chloroform, volatilizing the chloroform and recrystallizing the residue from any organic solvent which is non-reactive with the dioxide. Alternatively, the reaction products can be diluted with ether, washed with dilute base and water, respectively, dried, evaporated to dryness under vacuum, and redissolved in any convenient organic solvent from which the desired compound can be obtained upon crystallization. It is sometimes preferred not to crystallize the dioxide, as the residue obtained after removal of the solvent is of sufficient purity to be used in subsequent reactions. Other recovery means include pouring the reaction product into crushed ice or ice-water, filtering, and drying the precipitate. Infra-red analysis can be used to confirm the structures of the corresponding 3(4),17(20)-dioxido compounds obtained from the starting enol acylates of pregnane-3,11,20-trione.

Under the conditions of the present process, double bonds in the 3(4) and 17(20)-positions of the starting steroid compound are epoxidized, one atom of oxygen being added to each of these double bonds, thereby forming the oxido-linkage in the 3(4) and 17(20) positions, respectively. Furthermore, the ethylenic linkage in the 9(11)-position of the starting tri-enol acylate of pregnane-3,11,20-trione, although forming a structure similar to that existing in the 3(4) and 17(20)-positions, is non-reactive under the process of the present invention. Under optimum conditions, yields of up to eighty percent of the 3(4),17(20)-dioxido compounds of the poly-enol acylates of pregnane-3,11,20-trione are consistently achieved.

The following examples are illustrative of the process and products of the present invention, but are not to be construed as limiting.

*Preparation 1.—3,11,20-tri-enol acetate of pregnane-3,11,20-trione*

Two and thirty-six one-hundredths grams (2.36 grams) of pregnane-3,11,20-trione was added to a mixture of 240 milliliters of acetic anhydride and 0.96 gram of para-toluenesulfonic acid and the resulting mixture heated to a temperature of 140 degrees centigrade, at which temperature distillation of the acetic anhydride began. Distillation of the acetic anhydride was then continued at a slow rate for a period of five hours, at the end of which time sixty milliliters of the reaction solution remained in the reaction flask. The contents of the flask were cooled, poured into ice-water and extracted with ether. The ether extract was washed with successive 100 milliliter portions of dilute sodium carbonate solution and water, dried, and passed over a column of alumina. The column was eluted with ether and the dark brown eluate concentrated to yield 3.5 grams of 3,11,20-triacetoxy-3,9(11),17(20-pregnatriene as an oil. The structure was confirmed by infra-red analysis.

*Preparation 2.—3,11,20-tri-enol propionate of pregnane-3,11,20-trione*

Using the procedure described in Preparation 1, pregnane-3,11,20-trione is converted to the 3,11,20-tri-enol propionate by reaction with propionic anhydride.

In essentially the same manner as given in Preparations 1 and 2, the following tri-enol acylates are prepared from pregnane-3,11,20-trione and the appropriate acid anhydride: 3,11,20-tri-enol butyrate of pregnane-3,11,20-trione, 3,11,20-tri-enol heptoate of pregnane-3,11,20-trione, 3,11,20-tri-enol octanoate of pregnane-3,11,20-trione, 3,11,20-tri-enol benzoate of pregnane-3,11,20-trione, and the like.

*Example 1.—3,11,20-triacetoxy-3(4),17(20)-dioxido-9(11)-pregnene*

Three and one-half grams of 3,11,20-triacetoxy-3,9(11),17(20)-pregnatriene from Preparation 1 was dissolved in 23 milliliters of chloroform and to the resulting solution was added twelve milliliters of forty percent peracetic acid in which 0.320 gram of sodium acetate had been dissolved. The resulting mixture was shaken for a period of ninety minutes on a rotary agitating machine and the reaction mixture then diluted with 100 milliliters of ether. The reaction contents were then washed with successive 100-milliliter portions of dilute sodium bicarbonate and water, respectively, dried over anhydrous sodium sulfate, and evaporated to dryness. The residue weighed 2.2 grams, and was the 3(4),17(20)-dioxide of 3,11,20 - triacetoxy-(3,9(11),17(20)-pregnatriene as confirmed by infra-red analysis.

*Example 2.—3,11,20-tri-propionoxy-3(4),17(20)-dioxido-9(11)-pregnene*

Following the procedure given in Example 1, the 3,11,20-tri-enol propionate of pregnane-3,11,20-trione is converted to the corresponding 3(4),17(20)-dioxide by reaction with peracetic acid.

*Example 3.—3,11,20-tributyroyloxy-3(4),17(20)-dioxido-9(11)-pregnene*

Following the procedure given in Example 1, the 3,11,20-tri-enol butyrate of pregnane-3,11,20-trione is converted to the corresponding 3(4),-17(20)-dioxide by reaction with peracetic acid.

*Example 4.—3,11,20-triheptanoyloxy-3(4), 17(20)-dioxido-9(11)-pregnene*

Following the procedure given in Example 1, the 3,11,20-tri-enol heptanoate of pregnane-3,11,20-trione is converted to the corresponding 3(4),17(20)-dioxide by reaction with peracetic acid.

*Example 5.—3,11,20-trioctanoyloxy-3(4),17(20)-dioxide-9(11)-pregnene*

Following the procedure given in Example 1, the 3,11,20-tri-enol octanoate of pregnane-3,11,20-trione is converted to the corresponding 3(4),17(20)-dioxide by reaction with peracetic acid.

*Example 6.—3,11,20-tribenzoyloxy-3(4),17(20)-dioxido-9(11)-pregnene*

Following the procedure given in Example 1, the 3,11,20-tri-enol benzoate of pregnane-3,11,20-trione is converted to the corresponding 3(4),-17(20)-dioxide by reaction with peracetic acid.

*Example 7.—3,20-diacetoxy-3(4),17(20)-dioxidopregnane-11-one*

Following the procedure given in Example 1, the 3,20-di-enol acetate of pregnane-3,11,20-trione is converted to the corresponding 3(4),-17(20)-dioxide by reaction with peracetic acid. The di-enol acetate is prepared under mild conditions of enol acetylation of pregnane-3,11,20-trione in toluene solvent, in which case the 11-ketone does not form an enol acetate.

In the same manner as illustrated in the examples, other 3(4),17(20)-dioxides of the 3,11,20-tri-enol acylates and of the 3,20-di-enol acylates of pregnane-3,11,20-trione are produced, such as the 3(4),17(20)-dioxide of 3,11,20-triformoxy - 3,9(11),17(20) - pregnatriene, 3(4),-17(20)-dioxide of 3,11,20-triisobutyroyloxy-3,-9(11),17(20)-pregnatriene, 3(4),17(20)-dioxide of 3,11,20 - trivaleroyloxy - 3,9(11),17(20) - pregnatriene, 3(4),17(20)-dioxide of 3,11,20-trihexanoyloxy - 3,9(11),17(20) - pregnatriene, 3(4),-17(20)-dioxide of 3,11,20-triphenylacetoxy-3,-9(11),17(20-pregnatriene, 3(4),17(20)-dioxide of 3,20-diformoxy - 3,17(20) - pregnadiene - 11-one, 3(4),17(20)-dioxide of 3,20-dibutyroyloxy-3,-17(20)-pregnadiene-11-one, 3(4),17(20)-dioxide of 3,20-dioctanoyloxy-3,17(20)-pregnadiene-11-one.

It is to be understood that the invention is not to be limited to the exact details of operation or exact compounds shown and described, as obvious modifications and equivalents will be apparent to one skilled in the art, and the invention therefore is to be limited only by the scope of the appended claims.

We claim:

1. A 3(4),17(20)-dioxide of a poly-enol acylate of pregnane-3,11,20-trione, wherein the acyloxy groups are of the formula AcO, Ac being the acyl radial of a monocarboxylic hydrocarbon acid containing from one to eight carbon atoms, inclusive.

2. A 3(4),17(20)-dioxide of a 3,11,20-tri-enol acylate of pregnane-3,11,20-trione, wherein the acyloxy groups are of the formula AcO, Ac being the acyl radial of a monocarboxylic hydrocarbon acid containing from one to eight carbon atoms, inclusive.

3. 3,11,20 - triacetoxy - 3(4),17(20) - dioxido - 9(11)-pregnene.

4. A 3(4),17(20)-dioxide of a 3,20-di-enol acylate of pregnane-3,11,20-trione, wherein the acyloxy groups are of the formula AcO, Ac being the acyl radial of a monocarboxylic hydrocarbon acid containing from one to eight carbon atoms, inclusive.

5. 3,20 - diacetoxy - 3(4),17(20) - dioxidopregnane-11-one.

6. The process for the production of a 3(4),17(20)-dioxide of a poly-enol acylate of pregnane-3,11,20-trione, which includes: mixing together at a temperature between about zero and about 100 degrees centigrade (1) a poly-enol acylate of pregnane-3,11,20-trione, wherein the acyloxy groups are of the formula AcO, Ac being the residue of an organic carboxylic acid containing from one to eight carbon atoms, inclusive, and (2) an epoxidizing agent selected from the group consisting of organic peracids and hydrogen peroxide, and separating the thus-produced 3(4), 17(20)-dioxide from the reaction product.

7. The process for the production of a 3,11,20-triacyloxy-3(4),17(20) - dioxido - 9(11) - pregnene, which includes: mixing together at a temperature between about zero and about 100 degrees centigrade (1) a 3,11,20-tri-enol acylate of pregnane-3,11,20-trione, wherein the acyloxy groups are of the formula AcO, Ac being the residue of an organic carboxylic acid containing from one to eight carbon atoms, inclusive, with (2) an apoxidizing agent selected from the group consisting of organic peracids and hydrogen peroxide, and separating the thus-produced 3(4),17(20)-dioxide from the reaction product.

8. The process for the production of a 3,11,20-triacyloxy-3(4),17(20) - dioxido - 9(11) - pregnene, which includes: mixing together at a temperature between about zero and 100 degrees centigrade (1) a 3,11,20-tri-enol acylate of pregnane-3,11,20-trione, wherein the acyloxy groups are of the formula AcO, Ac being the residue of an organic carboxylic acid containing from one to eight carbon atoms, inclusive, and (2) an organic peracid, and separating the thus-produced 3(4),17(20)-dioxide from the reaction product.

9. The process for the production of a 3,11,20-triacyloxy-3(4),17(20) - dioxido - 9(11) - pregnene, which includes: mixing together at a temperature between about zero and about 100 degrees centigrade (1) a 3,11,20-tri-enol acylate of pregnane-3,11,20-trione, wherein the acyloxy groups are of the formula AcO, Ac being the residue of an organic carboxylic acid containing from one to eight carbon atoms, inclusive, with (2) peracetic acid, and separating the thus-produced 3(4),17(20)-dioxide from the reaction product.

10. The process for the production of 3,11,20-triacetoxy-3(4),17(20) - dioxido - 9(11) - pregnene, which includes: mixing together at a temperature between about zero and 100 degrees centigrade (1) 3,11,20-triacetoxy-3,9(11),17(20)-pregnatriene with (2) peracetic acid, and separating the thus-produced 3(14),17(20)-dioxide of 3,11,20-triacetoxy-3,9(11),17(20) - pregnatriene from the reaction product.

11. The process for the production of a 3,20-diacyloxy-3(4),17(20)-dioxido-pregnane -11-one, which includes: mixing together at a temperature between about zero and about 100 degrees centigrade (1) a 3,20-di-enol acylate of pregnane-3,11,20-trione, wherein the acyloxy groups are of the formula AcO, Ac being the residue of an organic carboxylic acid containing from one to eight carbon atoms, inclusive, with (2) an epoxidizing agent selected from the group consisting of organic peracids and hydrogen peroxide, and separating the thus-produced 3(4),17(20)-dioxide from the reaction product.

12. The process for the production of a 3,20-diacyloxy-3(4),17(20) - dioxido - pregnane - 11-one, which includes: mixing together at a temperature between about zero and 100 degrees centigrade (1) a 3,20-di-enol acylate of pregnane-3,11,20-trione, wherein the acyloxy groups are of the formula AcO, Ac being the residue of an organic carboxylic acid containing from one to eight carbon atoms, inclusive, and (2) an organic peracid, and separating the thus-produced 3(4),17(20)-dioxide from the reaction product.

13. The process for the production of a 3,20-diacyloxy - 3(4),17(20) - dioxido - pregnane - 11-one, which includes: mixing together at a temperature between about zero and about 100 degrees centigrade (1) a 3,20-di-enol acylate of pregnane-3,11,20-trione, wherein the acyloxy groups are of the formula AcO, Ac being the residue of an organic carboxylic acid containing from one to eight carbon atoms, inclusive, with (2) peracetic acid, and separating the thus-produced 3(4),17(20)-dioxide from the reaction product.

14. The process for the production of 3,20-diacetoxy - 3(4),17(20) - dioxido - pregnane - 11-one, which includes: mixing together at a temperature between about zero and 100 degress centigrade (1) 3,20 - diacetoxy - 9(11),17(20)-pregnadiene-11-one with (2) peracetic acid, and separating the thus-produced 3(4),17(20)-dioxide of 3,20-diacetoxy-9(11),17(20)-pregnadiene-11-one from the reaction product.

GEORGE B. SPERO.
ROBERT H. LEVIN.

No references cited.